United States Patent [19]
Williams

[11] 3,769,129
[45] *Oct. 30, 1973

[54] METHOD OF MAKING AN EMBOSSED COMPOSITE SHEET

[75] Inventor: Alvin R. Williams, Northfield, Ohio

[73] Assignee: United States Steel Corporation, Pittsburgh, Pa.

[ * ] Notice: The portion of the term of this patent subsequent to Sept. 30, 1988 has been disclaimed.

[22] Filed: Mar. 29, 1968

[21] Appl. No.: 717,206

[52] U.S. Cl.................. 156/209, 156/220, 156/324, 161/123
[51] Int. Cl............................................. B44c 1/00
[58] Field of Search.................... 156/209, 219, 220, 156/320, 322, 324; 29/488; 72/363; 161/217

[56] References Cited
UNITED STATES PATENTS

| | | | |
|---|---|---|---|
| 3,258,513 | 6/1966 | Berry et al. | 156/247 X |
| 2,562,641 | 7/1951 | Saunders | 156/322 |
| 2,735,170 | 2/1956 | Moffatt | 29/488 |
| 2,817,618 | 12/1957 | Hahn | 156/320 X |
| 2,830,001 | 4/1958 | Barnes et al. | 161/186 X |
| 3,235,440 | 2/1966 | Gould | 156/209 |
| 3,305,419 | 2/1967 | Voelker | 156/209 |

*Primary Examiner*—Samuel W. Engle
*Attorney*—Robert J. Leek, Jr.

[57] ABSTRACT

Method of making an embossed composite sheet including the steps of making an assembly of a base layer and a face layer with a layer of adhesive therebetween, heating the assembly to a temperature at which the adhesive is plastic, placing an embossing sheet having the desired pattern thereon on the face layer, and then exerting sufficient pressure on the embossing sheet while the assembled layers are so heated to impress the pattern on said face layer.

6 Claims, 2 Drawing Figures

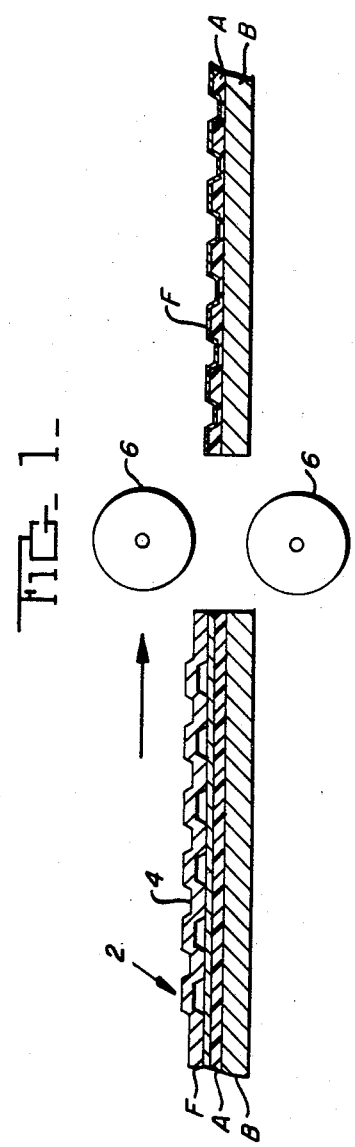
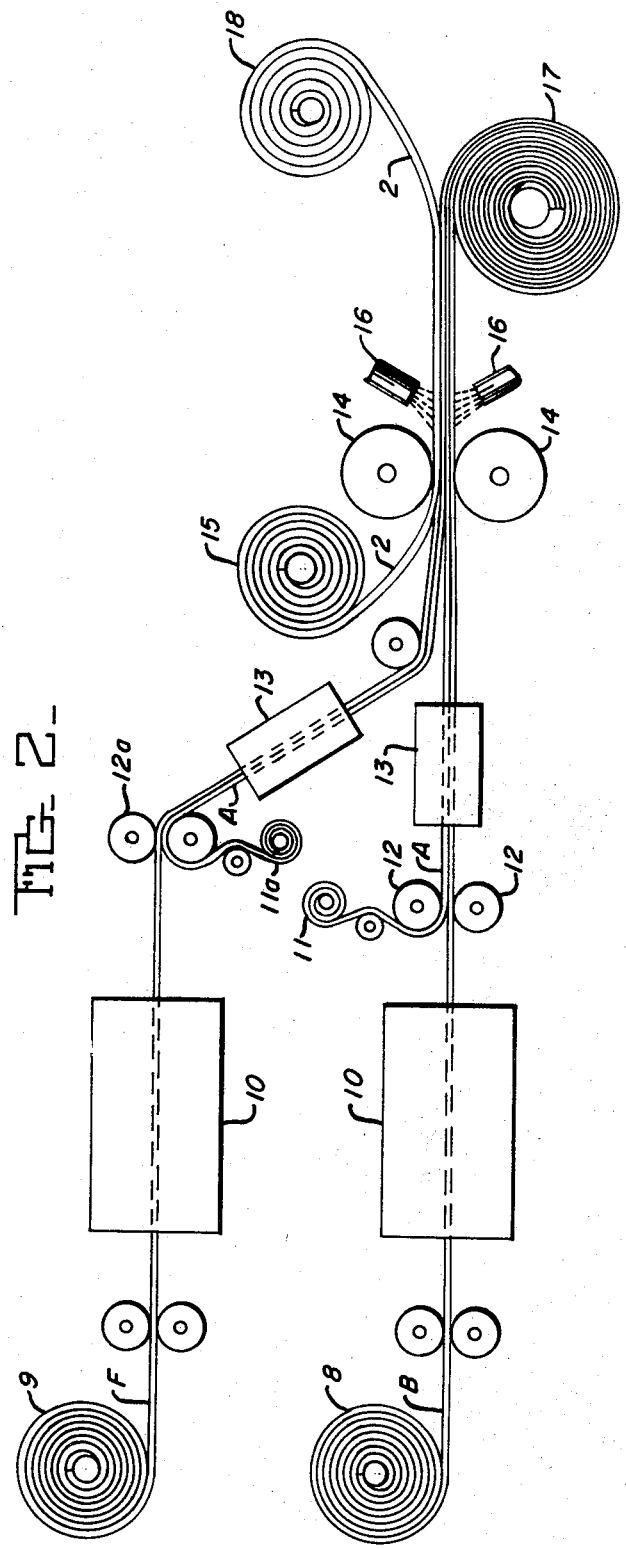

METHOD OF MAKING AN EMBOSSED COMPOSITE SHEET

This invention relates to a method of making an embossed composite sheet and more particularly to making such a composite sheet in which a bottom layer, preferably of metal, gives the desired structural strength and the upper layer is a thinner sheet of hard metal with a thermoplastic adhesive between the layers. The common way of making such sheets is to pass an assembly of these three layers through a pair of rolls with the pattern to be embossed being provided on one of the rolls. While this method is satisfactory for many purposes it is expensive to machine the pattern into the rolls and some patterns are extremely difficult or impossible to machine on the roll.

It is therefore an object of my invention to provide an improved method of making an embossed composite sheet without the use of engraved rolls.

This and other objects will be more apparent after referring to the following specification and attached drawing, in which:

FIG. 1 is a schematic view of a pair of rolls for providing the necessary pressure on the assembly shown on the left of the rolls to provide the embossed composite sheet shown on the right of the rolls; and FIG. 2 is a schematic view of apparatus which may be used in the practice of my invention.

Referring more particularly to FIG. 1 of the drawings, reference character B indicates a base layer or sheet which provides the necessary structural strength for the composite sheet. The sheet B may be made of carbon steel, either bare or coated with zinc or aluminum, cardboard, asbestos cement board, or the like. A face sheet F is made of material that has the desired surface qualities of hardness and appearance, such as stainless steel which is preferably fully annealed so as to be as soft and ductile as possible. Other materials, of course, may be used for this purpose. A layer of adhesive A is provided between the layers B and F. The adhesive A may be normally liquid or solid, but must be plastic during the embossing operation. The adhesive A is preferably a resinous, plastic material which bonds well to sheets B and F. It should soften under heat and regain high strength at ambient temperatures. Two suitable adhesives are USS NEXUS sold by United States Steel Corporation and PA 4459 sold by Minnesota Mining and Manufacturing Corporation. The materials and arrangement thereof are the same as in the former process and no novelty is claimed in respect thereto.

According to my invention I provide an embossing sheet 2 having a desired pattern 4 thereon. The sheet 2 may be made of metal, but I have also practiced my invention using decorative paper, stencils and wire screen. With the assembly of layers A, B and F heated to a temperature at which the adhesive is plastic, the embossing sheet 2 is placed on the face sheet F as shown to the left of FIG. 1 and pressure applied thereto in order to impress the pattern on the face layer F. Only a relatively small amount of pressure is required since the thickness of layer A is at least as thick as the depth of the pattern on sheet 2. The pressure of the sheet 2 deforms the sheet F with the deformation of the sheet F displacing a portion of the adhesive layer A. While the pressure may be applied in various ways, it is preferred to apply it by passing the assembly through a pair of rolls 6 so as to obtain the completed composite sheet shown to the right of FIG. 1. The embossing may be affected simultaneously with the bonding operation or subsequently by a separate operation.

The operation may be carried out continuously as shown in FIG. 2. As there shown a base layer B and face layer F are uncoiled from coils 8 and 9, respectively, and pass through preheaters 10 where they are heated to a temperature between 300° and 450°F. An adhesive layer A is rolled onto layer B from a coil 11 by means of rolls 12 and/or onto layer F from a coil 11a by means of rolls 12a. The layers A, B and F are then heated in heaters 13 to the optimum bonding temperature of the adhesive after which they are passed through pressure rolls 14 with embossing strip 2 being positioned on top of strip F before reaching the rolls. The strip 2 may be fed from a coil 15 as shown. The rolls 14 are kept at room temperature so that the adhesive will be rapidly cooled upon reaching them. The rolls 14 in one operation join the adhesive and metal layers together and apply sufficient pressure to force the pattern 4 into layer F. The thickness of the metal layer may also be reduced somewhat. Auxiliary cooling may be provided by air or water sprays 16. The composite strip is wound onto a coiler 17 with the strip 2 being wound on a coil 18.

While several embodiments of my invention have been shown and described, it will be apparent that other adaptations and modifications may be made without departing from the scope of the following claims.

I claim:

1. The method of making an embossed composite sheet which comprises providing a relatively flat base layer, providing a layer of plastic adhesive on said base layer, providing a relatively flat face metal layer on said adhesive, providing an embossing sheet having the desired embossing pattern thereon on said face layer, said embossing sheet being of such size as to cover the entire surface to be embossed, then passing the base layer, the plastic adhesive, the face metal layer and embossing sheet between a pair of smooth rolls to apply pressure on said embossing sheet while the adhesive is plastic to impress said pattern on said face layer, and then separating said embossing sheet from said composite sheet.

2. The method of claim 1 in which said adhesive layer has a thickness at least as thick as the depth of the pattern on said sheet.

3. The method of claim 1 in which said adhesive is thermoplastic, and which method includes the step of heating said layers prior to application of pressure to a temperature at which said adhesive is plastic.

4. The method of claim 2 in which said adhesive is thermoplastic, and which method includes the step of heating said layers prior to application of pressure to a temperature at which said adhesive is plastic.

5. The method of claim 1 including the steps of uncoiling the base layer from a coil, uncoiling the flat metal layer from a coil and bringing the base layer and metal layer together with said adhesive therebetween, uncoiling the embossing sheet from a coil and positioning it on said flat metal layer, and coiling the embossed composite sheet after separating from the embossing sheet.

6. The method of claim 5 in which the layer of plastic is at least as thick as the depth of the pattern on the sheet and is provided by placing it on adjacent sides of said base layer and metal layer prior to bringing them together, and which method includes the step of heating said layers with adhesive thereon prior to rolling.

* * * * *